United States Patent
Hayashi

[11] Patent Number: 5,593,279
[45] Date of Patent: Jan. 14, 1997

[54] SUCTION CONNECTOR FOR PUMP

[75] Inventor: Tetsuji Hayashi, Gifuken, Japan

[73] Assignee: Kayaba Industry Co., Ltd., Minato-ku, Japan

[21] Appl. No.: 608,709

[22] Filed: Feb. 29, 1996

[51] Int. Cl.⁶ .................................................... F01D 25/26
[52] U.S. Cl. ........................ 415/213.1; 285/205; 285/382
[58] Field of Search .......................... 415/182.1, 213.1; 285/205, 206, 211, 162, 382, 382.5

[56] References Cited

U.S. PATENT DOCUMENTS

| | | | |
|---|---|---|---|
| 521,017 | 6/1894 | Condict | 285/211 |
| 536,096 | 3/1895 | Quiggin | 285/211 |
| 4,575,132 | 3/1986 | Nattel | 285/205 |
| 5,213,378 | 5/1993 | MacGregor | 285/205 |
| 5,333,917 | 8/1994 | Davey et al. | 285/205 |
| 5,387,014 | 2/1995 | Chevallier | 285/206 |
| 5,526,605 | 6/1996 | O'Dougherty | 285/205 |

*Primary Examiner*—John T. Kwon
*Attorney, Agent, or Firm*—Steinberg, Raskin & Davidson, P.C.

[57] ABSTRACT

A suction connector for a pump capable of forming a pipe and plate integrally with each other without soldering or welding, to thereby eliminating disadvantages due to soldering or welding. A pipe is compressed at a predetermined portion thereof, so that the portion is radially outwardly projected, resulting in providing a flange. The flange thus formed is pressedly fixed to a plate.

5 Claims, 4 Drawing Sheets

5,593,279

SUCTION CONNECTOR FOR PUMP

BACKGROUND OF THE INVENTION

This invention relates to a suction connector for a pump, and more particularly to a suction connector adapted to be fixed to a suction port of a body of a pump.

A conventional suction connector for a pump is constructed in such a manner as shown in FIGS. 11 and 12. More particularly, the conventional suction connector includes a flange 1 formed with a through-hole, via which a pipe 2 is inserted. The flange 1 and pipe 2 are joined to each other by soldering, welding or the like.

Reference numeral 3 designates a body of a pump or a pump body, which, as shown in FIG. 11, is formed with a suction port 4. The pump body 3 is also formed with an annular seal groove 5 which is upwardly open. The annular seal groove 5 is arranged so as to surround the suction port 4. Further, the pump body 3 is formed with a pair of bolt holes 6 so as to be positioned outwardly of the annular seal groove 5.

The flange 1 of the suction connector is formed with a pair of through-holes 7 in a manner to positionally correspond to the bolt holes 6 of the pump body 3. Thus, the suction connector is fixedly mounted on the pump body 3 by means of bolts 8 inserted through the bolt holes 6 of the pump body 3 and the through-holes 7 of the flange 1 which are kept aligned with each other. Prior to such connection of the suction connector to the pump body 3, a seal 9 is fitted in the seal groove 5.

Such sealed connection of the suction connector to the pump body 3 by means of the bolt 8 permits the pipe 2 and suction hole 4 to be aligned with each other and sealed by means of the seal 9.

In the conventional suction connector, as described above, joining of the pipe 2 to the flange 1 takes place by soldering, welding or the like, resulting in requiring not only much time and labor but electric power and a soldering agent, leading to an increase in manufacturing cost of the suction connector.

Also, the above-described welding or soldering causes adhesion of scale to the suction connector, so that a scale removing procedure such as acid pickling is required. Unfortunately, acid pickling causes corrosion of the connector or the like, resulting in quality and reliability of the suction connector being deteriorated.

Further, a failure in soldering or welding causes oil leakage, so that quality and reliability of the suction connector are further deteriorated.

SUMMARY OF THE INVENTION

The present invention has been made in view of the foregoing disadvantage of the prior art.

Accordingly, it is an object of the present invention to provide a suction connector for a pump which is capable of constantly exhibiting stable quality and reliability.

It is another object of the present invention to provide a suction connector for a pump which is capable of eliminating joining operation such as welding, soldering or the like, to thereby accomplish energy, labor and time savings, leading to a decrease in manufacturing cost.

It is a further object of the present invention to provide a suction connector for a pump which is capable of being produced by molding.

It is still another object of the present invention to provide a suction connector for a pump which is capable of being readily attached to a pump body.

In accordance with the present invention, a suction connector for a pump which is adapted to be fixed to a suction port of a pump body is provided. The suction connector includes a pipe provided with at least one flange, which is formed by compressing a predetermined portion of the pipe in an axial direction thereof to radially outwardly project the portion. The suction connector also includes a plate formed with a recess in which the pipe is fitted, resulting in the pipe being inserted through the plate. The flange is forced while fitting the pipe in the recess of the plate and the plate is fixed to the pump body.

In a preferred embodiment of the present invention, the recess of the plate and a portion of the pipe positioned in proximity to the flange cooperate with each other to provide a locking mechanism for preventing rotation of the pipe with respect to the plate.

Also, in accordance with the present invention, a suction connector for a pump which is adapted to be fixed to a suction port of a pump body is provided. The suction connector includes a pipe provided with a first flange and a second flange. The first and second flanges each are formed by compressing a predetermined portion of the pipe in an axial direction thereof to radially outwardly project the portion. The suction connector also includes a plate formed with a recess. The pipe is fitted at a portion thereof positioned below the first flange in the recess of the plate. The second flange is arranged below the portion of the pipe fitted in the recess of the plate. The plate is fixed to the pump body.

In a preferred embodiment of the present invention, the recess of the plate is formed on a periphery thereof with an indentation. The pipe is held at a part thereof on the indentation of the recess due to deformation of the pipe occurring when the second flange is formed by compression.

In a preferred embodiment of the present invention, the indentation comprises at least one cutout.

BRIEF DESCRIPTION OF THE DRAWINGS

These and other objects and many of the attendant advantages of the present invention will be readily appreciated as the same becomes better understood by reference t the following detailed description when considered in connection with the accompanying drawings; wherein.

DETAILED DESCRIPTION OF THE PREFERRED EMBODIMENTS

Figure 1:
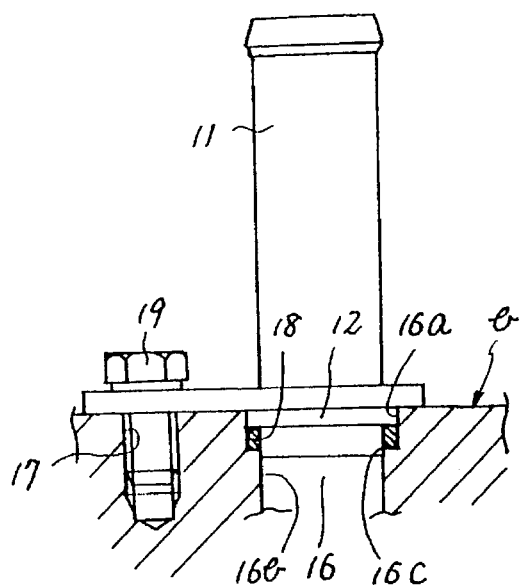
FIG. 1 is a schematic front elevation view partly in section showing an embodiment of a suction connector for a pump according to the present invention which is attached to a pump body.
Figure 2:
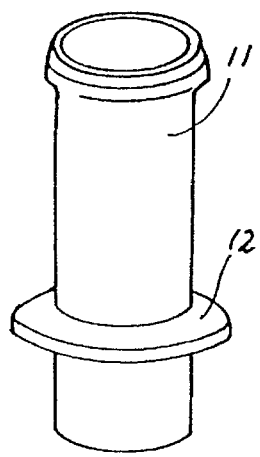
FIG. 2 is a perspective view of the suction connector shown in FIG. 1.
Figure 3:
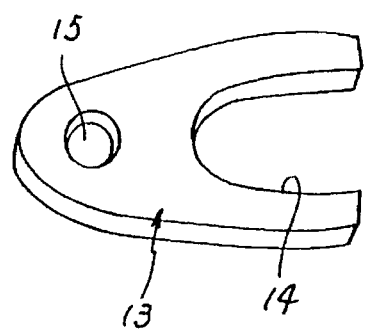
FIG. 3 is a perspective view showing a plate incorporated in the suction connector of FIG. 1.
Figure 4:
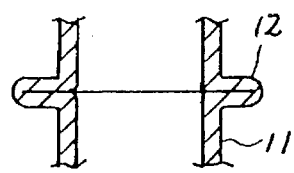
FIG. 4 is a fragmentary sectional view showing a pipe incorporated in the suction connector of FIG. 1.

Now, a suction connector for a pump according to the present invention will be described hereinafter with reference to FIGS. 1 to 10.

Referring first to FIGS. 1 to 4, a first embodiment of a suction connector for a pump according to the present invention is illustrated. A suction connector of the illustrated embodiment includes a pipe 11 provided at a predetermined portion thereof with a flange 12. The flange 12 is formed by axially compressing the above-described portion of the pipe 11 by means of a pressing machine or the like to radially outwardly project the portion.

The plate 13 is formed at one end thereof with a recess 14 and at the other end thereof with a single through-hole 15.

A pump body b is formed with a suction port 16. The suction port 16 is formed at an opening thereof with a diameter-increased portion 16a. The suction port 16 is also formed at a portion thereof positioned below the diameter-increased portion 16a with a diameter-reduced portion 16b, so that an annular step portion 16c is defined between the upper diameter-increased portion 16a and the lower diameter-reduced portion 16b.

The diameter-increased portion 16a of the suction port 16 is formed into a diameter slightly larger than an outer diameter of the flange 12, so that the flange 12 may be snugly fitted in the diameter-increased portion 16a of the suction port 16 of the pump body b. The pump body b is formed with a bolt hole 17 threaded therethrough in a manner to correspond to the through-hole 15 of the plate 13.

Now, the manner of mounting of the suction connector on the pump body b will be described hereinafter.

First, a seal 18 is fitted in the diameter-increased portion 16a of the suction port 16 and then the flange 12 is likewise fitted in the diameter-increased portion 16a so as to be positioned on the seal 18. Subsequently, the recess 14 of the plate 13 is fitted on the pipe 11 and then a bolt is threadedly inserted via the through-hole 15 into the threaded bolt hole 17 of the pump body b while forcing the plate 13 against the flange 12, so that the plate 13 may be tightly fixed to the pump body body b. This results in the pipe 11 being fixedly mounted on the pump body b through the plate 11.

Figure 11:
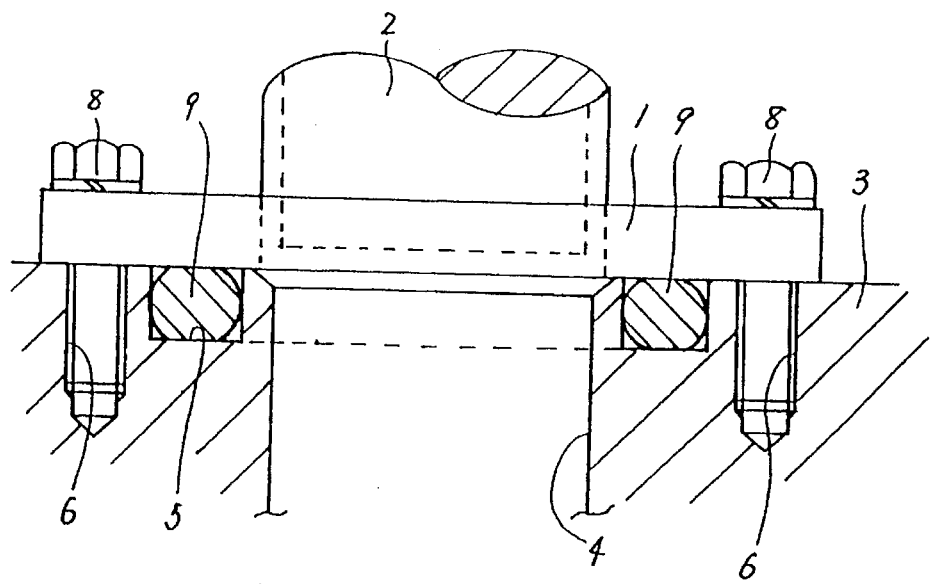
FIG. 11 is a front elevation view partly in section showing a conventional suction connector for a pump, which is attached to a pump body.
Figure 12:
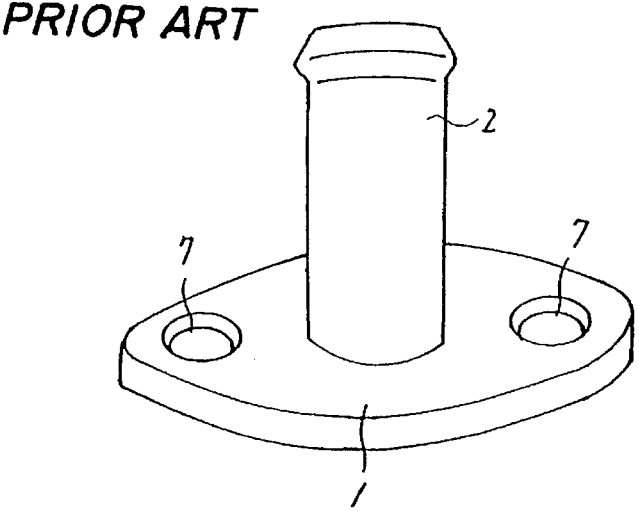
FIG. 12 is a perspective view of the conventional suction connector shown in FIG. 11.

The seal 18 is so formed that an interference of the seal 18 is defined in only a radial direction. This prevents elastic force of the seal 18 from acting in a direction of pushing up the flange 12 when the pipe 11 is inserted into the diameter-increased portion 16a of the suction port 16. This permits pressing force of the plate 13 against the flange 12 to be significantly decreased, so that mounting of the plate 13 on the pump body b is readily and safely accomplished by means of only one bolt 19. On the contrary, in the prior art described above with reference to FIGS. 11 and 12, elastic force of the seal 9 acts to push up the plate 1, therefore, force exceeding the elastic force is required for pressing the plate 1. Thus, the prior art requires two such bolts 8 for this purpose.

Thus, in the suction connector of the illustrated embodiment, the pipe 11 is compressed at a predetermined portion thereof in the axial direction thereof while being kept clamped by means of a pressing machine, to thereby form the flange 12 in a manner to be integral with the pipe 12. Thus, the illustrated embodiment effectively eliminates such fixing of the pipe to the flange by soldering, welding or the like as required in the prior art. Also, the suction connector of the illustrated embodiment is so constructed that an interference of the seal 18 is defined in only a radial direction. Such construction permits force for pressing the plate 13 to be significantly reduced, resulting in the plate 11 being effectively held by only one bolt 19.

Figure 5:
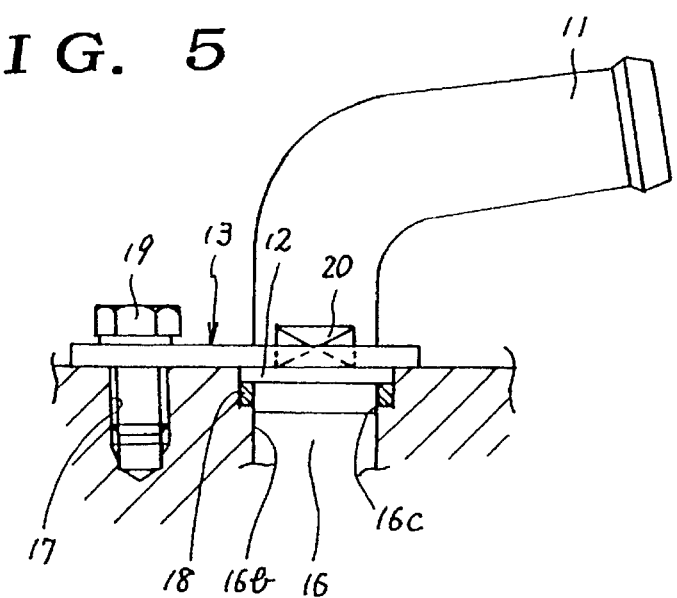
FIG. 5 is a schematic front elevation view partly in section showing another embodiment of a suction connector for a pump according to the present invention which is attached to a pump body.
Figure 6:
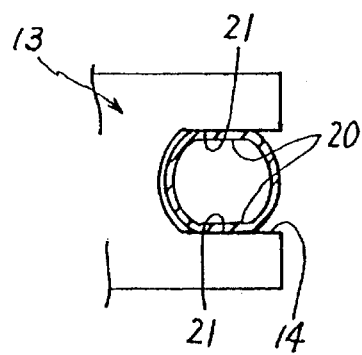
FIG. 6 is a sectional view showing connection between a plate and a pipe in the suction connector of FIG. 5.
Figure 7:
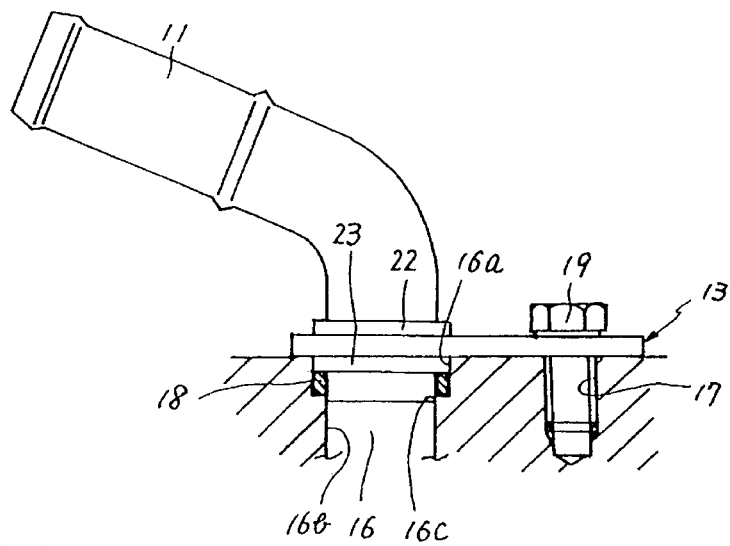
FIG. 7 is a schematic front elevation view partly in section showing a further embodiment of a suction connector for a pump according to the present invention which is attached to a pump body.
Figure 8:
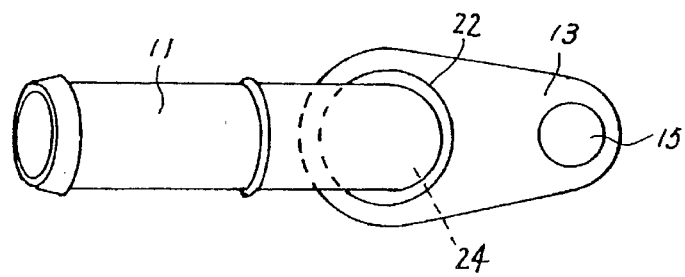
FIG. 8 is a sectional view showing connection between a plate and a pipe in the suction connector of FIG. 7.
Figure 9A:
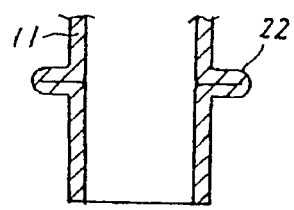
FIGS. 9A to 9C each are a schematic sectional view showing the manner of connection between a pipe and a plate in the suction connector of FIG. 7.
Figure 9B:
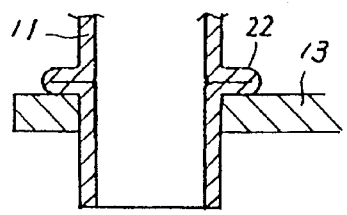
Figure 9C:
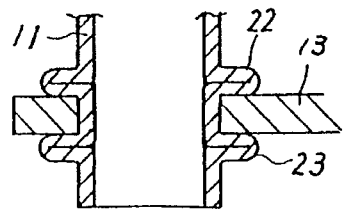
Figure 10:
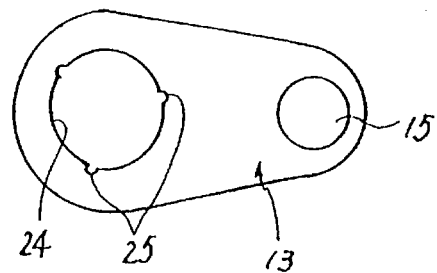
FIG. 10 is a plan view showing a plate incorporated in the suction connector of FIG. 7.

Referring now to FIGS. 5 and 6, a second embodiment of a suction connector for a pump according to the present invention is illustrated. In the second embodiment, a pipe 11 is bent, so that a direction of a distal end of the pipe 11 may be necessarily determined depending on connection of a plate 13 to a pump body b. In the second embodiment, a flange 12 is formed integrally with the pipe 11 as in the first embodiment described above. The pipe 11 is formed at a portion thereof positioned right above the flange 12 with a pair of flat portions 20. A plate 13 is formed with a recess 14, which is formed with a pair of parallel portions 21 in a manner to positionally correspond to the flat portions 20 of the pipe 11.

Thus, the pipe 11 is fitted in the recess 14 while aligning the flat portions 20 of the pipe 11 with the parallel portions 21 of the recess 14 of the plate 13. Then, the plate 13 is fixed on the body b by means of a single bolt 19 as in the first embodiment described above, resulting in a direction of the distal end of the pipe 11 being necessarily determined.

Thus, the second embodiment permits a direction of the pipe 11 to be necessarily determined during connection of the pipe 11 to the pump body b, so that the connection may be significantly facilitated.

As described above, in the second embodiment, the flat portions 20 of the pipe 11 and the parallel portions 21 of the plate 13 cooperate with each other to provide a locking mechanism for preventing rotation of the pipe 11 in the plate 13, to thereby fixedly position the former with respect to the latter. Alternatively, the locking mechanism for preventing rotation of the pipe 11 with respect to the plate 13 may be constructed in another way. For example, it may be provided by forming a part of the pipe 11 into an elliptic or polygonal shape and correspondingly forming the recess 14 of the plate 14 into an elliptic or polygonal shape. Also, it may be realized by forming the pipe with a projection and forming the recess with a depression for receiving the projection therein.

The remaining part of the second embodiment may be constructed in substantially the same manner as the first embodiment described above.

Referring now to FIGS. 7 to 10, a third embodiment of a suction connector for a pump according to the present invention is illustrated. In the third embodiment, a pipe 11 is formed with both a first or upper flange 22 and a second or lower flange 23 vertically spaced from each other. The flanges 22 and 23 each may be formed in substantially the same manner as the flange 12 of the first embodiment. A plate 13 is interposedly arranged between the first flange 22 and the second flange 23.

For this purpose, in the third embodiment, the plate 13 is formed at a distal end thereof with a holding hole 24 in place of the recess 14 in the first embodiment. A pipe 11 is formed with the first flange 22 as in the first embodiment. The pipe 11 thus formed is fitted at a portion thereof positioned below the first flange 22 in the holding hall 24 of the plate 13. Also, the pipe 11 has the second flange 23 formed at a portion thereof defined below the plate 13 when the pipe 11 is fitted in the plate 13 as described above. Thus, the plate 13 is interposedly arranged between the first and second flanges 22 and 23.

In the third embodiment, the holding hole 24 of the plate 13 may be formed on a periphery thereof with an indentation 25 and the pipe 13 is held at a part thereof in the indentation 25 of the holding hole 24 due to deformation of the pipe occurring when the second flange 23 is formed by compression. More specifically, the holding hole 24 of the plate 13 may be formed on a periphery thereof with at least one cutout acting as the indentation 25. In the illustrated embodiment, three such cutouts 25 are arranged so as to act as the indentation. Such arrangement of the cutouts 25 permits a part of a material for the pipe 11 to bite into the cutouts 25, to thereby provide a locking mechanism for preventing rotation of the pipe 11 in the holding plate 24 of the plate 13.

The remaining part of the third embodiment may be constructed in substantially the same manner as the first embodiment.

As can be seen from the foregoing, the suction connector of the present invention is so constructed that the flange is formed on a periphery of the pipe in a manner to be integral therewith by compression or pressing. Such construction eliminates disadvantages due to soldering or welding encountered with the prior art such as a deterioration in operating efficiency, a variation in quality or reliability of the suction connector and the like.

Also, in the present invention, the pipe may be necessarily positioned during connection of the suction connector to the pump body, resulting in operating efficiency being further increased.

Further, the suction connector of the present invention may be so constructed that the plate is arranged between the first flange of the pipe and the second flange thereof, resulting in being firmly held therebetween.

What is claimed is:

1. A suction connector for a pump which is adapted to be fixed to a suction port of a pump body, comprising:

a pipe provided with at least one flange;

said flange being formed by compressing a predetermined portion of said pipe in an axial direction thereof to radially outwardly project said portion; and a plate formed with a recess in which said pipe is fitted, resulting in said pipe being inserted through said plate;

said flange being forced while fitting said pipe in said recess of said plate;

said plate being fixed to the pump body.

2. A suction connector as defined in claim 1, wherein said recess of said plate and a portion of said pipe positioned in proximity to said flange cooperate with each other to provide a locking mechanism for preventing rotation of said pipe with respect to said plate.

3. A suction connector for a pump which is adapted to be fixed to a suction port of a pump body, comprising:

a pipe provided with a first flange and a second flange;

said first and second flanges each being formed by compressing a predetermined portion of said pipe in an axial direction thereof to radially outwardly project said portion;

a plate formed with a recess;

said pipe being fitted at a portion thereof positioned below said first flange in said recess of said plate;

said second flange being arranged below said portion of said pipe fitted in said recess of said plate;

said plate being fixed to the pump body.

4. A suction connector as defined in claim 3, wherein said recess of said plate is formed on a periphery thereof with an indentation;

said pipe being held at a part thereof on said indentation of said recess due to deformation of said pipe occurring when said second flange is formed by compression.

5. A suction connector as defined in claim 4, wherein said indentation comprises at least one cutout.

* * * * *